US009462189B2

(12) United States Patent
Mills et al.

(10) Patent No.: US 9,462,189 B2
(45) Date of Patent: Oct. 4, 2016

(54) PIECEWISE PERSPECTIVE TRANSFORM ENGINE

(71) Applicant: Apple Inc., Cupertino, CA (US)

(72) Inventors: Christopher L. Mills, Saratoga, CA (US); David R. Pope, Fremont, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/449,024

(22) Filed: Jul. 31, 2014

(65) Prior Publication Data

US 2016/0037073 A1 Feb. 4, 2016

(51) Int. Cl.
*H04N 5/232* (2006.01)
*G06T 3/00* (2006.01)

(52) U.S. Cl.
CPC ............... *H04N 5/2329* (2013.01); *G06T 3/00* (2013.01); *H04N 5/23258* (2013.01)

(58) Field of Classification Search
None
See application file for complete search history.

(56) References Cited

U.S. PATENT DOCUMENTS

| | | | |
|---|---|---|---|
| 7,542,597 B2 * | 6/2009 | Rahn et al. ................... | 382/133 |
| 8,570,386 B2 | 10/2013 | Castorina et al. | |
| 8,731,321 B2 | 5/2014 | Fujiwara et al. | |
| 8,760,513 B2 | 6/2014 | Strine et al. | |
| 2007/0177037 A1 * | 8/2007 | Kurata ........................... | 348/241 |
| 2008/0186386 A1 * | 8/2008 | Okada et al. .............. | 348/208.4 |
| 2008/0193024 A1 * | 8/2008 | Lee et al. ...................... | 382/233 |
| 2011/0090242 A1 | 4/2011 | Cote et al. | |
| 2011/0090351 A1 | 4/2011 | Cote et al. | |
| 2011/0090370 A1 | 4/2011 | Cote et al. | |
| 2011/0090371 A1 | 4/2011 | Cote et al. | |
| 2012/0081385 A1 | 4/2012 | Cote et al. | |
| 2013/0044241 A1 | 2/2013 | Zhou | |
| 2013/0229395 A1 | 9/2013 | Mills et al. | |
| 2013/0322746 A1 | 12/2013 | Cote et al. | |
| 2014/0028876 A1 | 1/2014 | Mills | |
| 2014/0071299 A1 | 3/2014 | Grundmann et al. | |

OTHER PUBLICATIONS

U.S. Appl. No. 14/449,010, filed Jul. 31, 2014, D. Amnon Silverstein.
U.S. Appl. No. 14/449,011, filed Jul. 31, 2014, Suk Hwan Lim.
(Continued)

*Primary Examiner* — Mark Monk
(74) *Attorney, Agent, or Firm* — Robert C. Kowert; Meyertons, Hood, Kivlin, Kowert & Goetzel, P.C.

(57) ABSTRACT

An image signal processor of a device, apparatus, or computing system that includes a camera capable of capturing image data may apply piecewise perspective transformations to image data received from the camera's image sensor. A scaling unit of an Image Signal Processor (ISP) may perform piecewise perspective transformations on a captured image to correct for rolling shutter artifacts and to provide video image stabilization. Image data may be divided into a series of horizontal slices and perspective transformations may be applied to each slice. The transformations may be based on motion data determined in any of various manners, such as by using gyroscopic data and/or optical-flow calculations. The piecewise perspective transforms may be encoded as Digital Difference Analyzer (DDA) steppers and may be implemented using separable scalar operations. The image signal processor may not write the received image data to system memory until after the transformations have been performed.

20 Claims, 8 Drawing Sheets

(56) References Cited

OTHER PUBLICATIONS

U.S. Appl. No. 14/449,015, filed Jul. 31, 2014, Suk Hwan Lim.
U.S. Appl. No. 14/449,016, filed Jul. 31, 2014, Suk Hwan Lim.
U.S. Appl. No. 14/449,019, filed Jul. 31, 2014, Christopher L. Mills.
U.S. Appl. No. 14/449,022, filed Jul. 31, 2014, Christopher L. Mills.
International Search Report and Written Opinion from PCT/US2015/043103, Date of mailing Nov. 17, 2015. Apple Inc., pp. 1-12.

* cited by examiner

PIECEWISE PERSPECTIVE TRANSFORM ENGINE

BACKGROUND

Increasing numbers of small, mobile multipurpose devices, such as mobile phones, smartphones, tablet and/or pad devices, may include high-resolution, small form factor cameras and are capable of receiving and processing image (or video) input. Additionally, the device may be capable of performing at least some processing/rendering of the graphical input (e.g., video frames), such as format conversion, window compositing, blending, scaling, and/or color correction.

When recording a scene captured frames may reflect camera motion (e.g., caused by a shaking hand, walking, or other types of disruptions). In some cases, artifact removal and/or image stabilization techniques may be applied to reduce the amount of motion exhibited in the captured images and/or to reduce the effects of motion caused by the camera's rolling shutter.

For instance, digital cameras, such as complementary metal-oxide-semiconductor (CMOS) cameras, frequently employ a method of image acquisition in which each frame is recorded by scanning across the frame row by row from top to bottom (or column by column across the frame) rather than by taking a single snapshot of the entire scene at a single point in time. Thus, not all parts of the image may be recorded at the same time. This method of image acquisition is sometimes called rolling shutter, because the shutter is moving (e.g., rolling) across the image area of the scene.

Due to the rolling shutter, visual distortions may be introduced and may be visually apparent when the entire image is displayed. In general, any movement of the camera as the image is captured may result in a warping or distortion of the image. Images captured using rolling shutter acquisition may exhibit different types of visual effects or distortions. One type of distortion may be caused by the camera not being held completely still throughout the entire process of scanning a frame. If the camera is moving horizontally, the image gets sheared. If the camera moves vertically, image is stretched or compressed.

SUMMARY

An image signal processor of a device, apparatus, or computing system that includes a camera capable of capturing video clips may, in some embodiments, be configured to apply one or more transformations (including image stabilization transformations) to image data received from the camera's image sensor. For example, the image signal processor may be configured to apply translation operations, horizontal or vertical scaling operations, rotations, shear transformations, and/or perspective transformations to correct for camera motion (e.g., a tilt, roll, or rotation of the camera during image capture) or to compensate for rolling shutter effects.

In some embodiments, the transformations may be applied in an in-stream piecewise manner to portions of the image data within the image signal processor (or an output rescaling unit thereof) after the data is received. For example, image data may be gathered into multiple line buffers of the image signal processor, where the pixels in each line buffer correspond to a line of pixels in the input image.

By leveraging existing filters and scalers of the image signal processor, rather than using a CPU or GPU, image stabilization may consume less bandwidth and power than used by existing techniques, according to some embodiments. For example, the image signal processor may not need to write the received image data to system memory until after the image stabilization transformations have been performed. Thus, by eliminating costly memory transfers between the system memory and the CPU or GPU, the cost of implementing image stabilization (in terms of memory bandwidth and power consumption) may be reduced, as compared to traditional image stabilization methods.

A variety of techniques may be used to determine the motion reflected in a captured scene, such as using data from a gyroscope in the camera, or generating motion vectors based on optical flow calculations, according to various embodiments. Regardless of how the motion data is generated, the resulting images (e.g., the frames of the video sequence) may require the application of one or more image transformations to adjust for the motion. These transformations may include any combination of offset translation, rotation, scaling, shear transformation and/or perspective transformation. In some embodiments, image stabilization operations may be applied piecewise to images, such as to account for the changes in motion during individual frame capture (e.g., due the rolling shutter or other camera motion). In some embodiments, image stabilization operations, such as the application of in-stream piecewise perspective transformations, may be performed within the image signal processor before the image data is stored to system memory.

Figure 1:
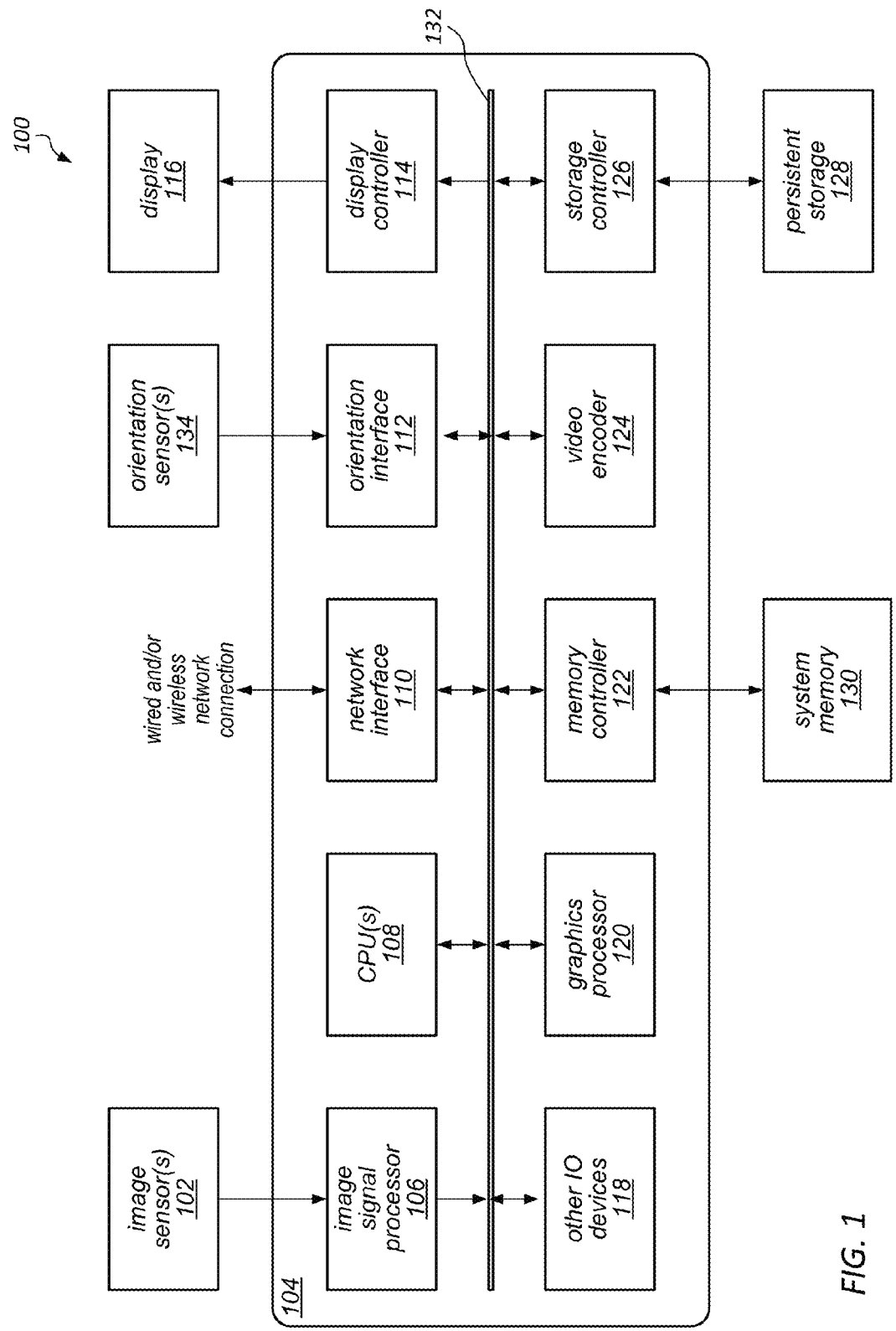
FIG. 1 is a logical block diagram illustrating an example system that may implement an image processing pipeline that performs in-stream piecewise perspective transformations, according to some embodiments.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

Figure 4:
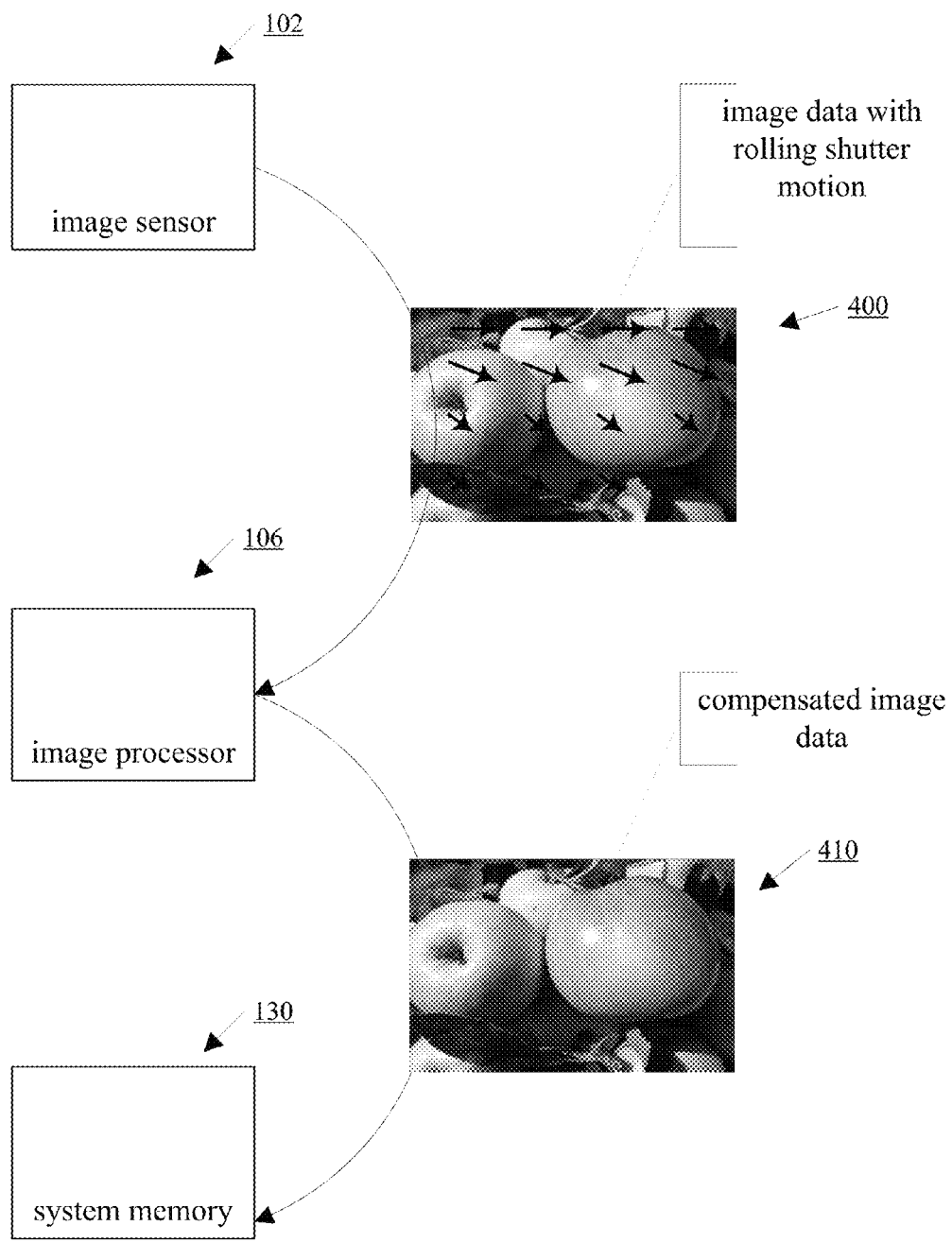
FIG. 4 is a logical block diagram illustrating one example of the use of in-stream piecewise perspective transformations, according to one embodiment.

As noted above, in-stream piecewise perspective transformations may be applied to image data to compensate for camera motion by warping the image data while the image data is received from the image sensor, according to some embodiments. Turning now to FIG. 4, which is a logical block diagram illustrating one embodiment of a method for in-stream performing piecewise perspective transformations. When performing in-stream piecewise perspective transformations, an image processor may determine motion corresponding to camera motion and or rolling shutter distortions. For example, image data 400 of FIG. 4 includes arrows representing the direction of example camera motion. Please note that the arrows within image data 400 are merely exemplary and do not represent any particular or actual camera motion.

In one embodiment, image processor 106 may determine motion information in any of various manners, such as by using gyroscopic data and/or optical flow calculations. Image sensor 102 may represent any of various sorts of image sensors, according to various embodiments. For example, in one embodiment, camera image sensor 102 may represent a CMOS based image sensor.

Image processor 106 may determine one or more transformations, possibly including one or more perspective transforms to apply to the image data to correct (at least partially) or compensate for motion-related artifacts in the captured image. Image processor 106 may then transform (or warp) the image data 400 based on the determined transformations to compensate for camera motion. The modified image data, such as compensated image data 410 may then be written out to memory 130, according to some embodiments. In some embodiments, the image data may be warped as it is written out to memory 130.

As noted above, image stabilization techniques may be applied to reduce the amount of motion reflected in the images obtained from an image recording device. In some embodiments, image stabilization techniques may be used to correct image artifacts caused by camera motions (e.g., caused by a hand shaking, a foot-fall, or other disturbances) and/or to reduce the effects of the rolling shutter of the video recording device. For example, in-stream piecewise perspective transformations may be applied in order to (at least partially) compensate for translational motion (e.g., motion of the camera to the left, right, up, and/or down), rotational motion (e.g., yaw, pitch, rolling left, or rolling right), and/or perspective distortion (e.g., distortion caused by tilting the camera slightly).

Additionally, the pixels on the image sensor of a video camera may be scanned out over time using a rolling shutter camera (e.g., a camera that scans an image line by line rather than using a shutter that opens, captures a full-frame image, and then closes). Thus, in some embodiments, one or more operations (e.g., transformations) may be performed on the captured image data to compensate for rolling shutter effects. For example, there may be a change in a scene being recorded between the time at which the top line of the image is captured and the time at which the bottom line of the image is captured, resulting in rolling shutter artifacts. Note that references to a "camera", a "video camera", or a "video recording device" in the descriptions that follow do not necessarily refer to a single-purpose device for capturing still images or video, but may refer more generally to any device, apparatus, or system that is configured to capture and process image data, including both still images and sequences of images (e.g., video clips).

In different embodiments, image stabilization may be performed in a variety of ways by the systems described herein. For instance, the system may be configured to determine the motion of the camera over the scene (or a rolling shutter artifact similar to that caused by such motion). Second, the system may adjust the image to at least partially correct the image (to compensate for the determined motion) using one or more transformations. In some embodiments, determining the motion may include receiving and using data from a gyroscope in the camera (e.g., a gyroscope that is integrated on the same device that contains the CMOS image sensor of the camera, or a gyroscope that is implemented by, for example, a separate MEMS device in the system). In other embodiments, determining the motion may include generating motion vectors based on optical flow calculations. As noted above, regardless of how the motion is determined and the corresponding motion data is generated, transformations may be applied to the resulting image to adjust for the determined motion. In other words, adjusting an image to (at least partially) compensate for determined motion may include determining how to transform the image data for the scene (e.g., what transformations to apply) to compensate for the motion. In various embodiments, these transformations may include any combination of offset translation, rotation, scaling, shear transformation and/or perspective transformation.

In some embodiments, image stabilization operations may involve applying multiple, different, in-stream piecewise perspective transformations to the image, due to the changes in motion during the frame capture (e.g., due to the rolling shutter and/or the actual movement of the camera during the frame capture). For example, if the camera moved left, then right, during capture of data for a single frame, so that the top of the image shifted to the right, the bottom of the image shifted to the left, it may be necessary to apply different adjustments to these different portions of the image in order to compensate for the camera movement and the rolling shutter effects. In some embodiments, the systems described herein may be configured to determine different motion vectors for different portions of a frame (i.e., different portions of an image in a sequence of images) and to apply different transformations to those different portions. In some embodiments, the systems described herein are configured to apply various transformations in a piecewise manner to different groupings of lines of pixels that correspond to lines of pixels in the image (i.e., the input image). For example, in one embodiment, the system may apply transformations piecewise to groups of 32 lines at a time (e.g., operating on one 32-line buffer at a time). For each 32-line slice, the system may be configured to determine and apply a respective transformation, or a respective set of transformations, each of which may include rotation, scaling, shear transformation, perspective transformation and/or another type of warping transformation, to compensate for the motion of the camera.

In some embodiments, the number of lines of pixels in the line buffers may be pre-determined and/or may be configurable or tunable by the user, and may be based on the desired granularity of the image stabilization operations. In other embodiments, the number of lines of pixels that are processed in the buffers using the same parameters (i.e., the height of the horizontal slices) may be variable within the image. For example, in one embodiment, transformation parameters may be defined with higher granularity (e.g., defining different parameter values for each set of eight lines) in the most important portion(s) of an image (e.g., in the middle of the image, or in the portion of the image containing the subject of the image), while transformation parameters may be defined with less granularity (e.g., defining different parameter values for each set of 64 lines) in less important portions of the image (e.g., at the top and bottom of the image). In still other embodiments, transformation parameters may vary across a single line of pixels.

For example, in one embodiment in which different transformation parameters are re-defined every 32 lines, the first line of a slice may use the parameter values in a first set of parameter values, and the $33^{rd}$ line of the slice may use the parameter values of the next set of parameter values. In this example, the parameter values applied to the lines in between may be the result of a linear interpolation between the two, such that for the $16^{th}$ line, the values applied to the line may be the result of an equal weighting between the two sets of parameter values. Similarly, the $32^{nd}$ line may use 31/32 of the next set of parameters and 1/32 of the current if interpolating, according to one embodiment. In other embodiments, there may be a non-linear weighting between the two sets of parameter values (e.g., based on the position of the slice within the image, the relative importance of the different slices in the image, or on other factors).

In some embodiments, image stabilization may be performed as part of the operation of the image signal processor. In other words, image stabilization operations may take advantage of the existing hardware of the image signal processor (or a modified version of the image signal processor) to perform various transformations as part of its image flow (e.g., in-stream). In some embodiments, the image signal processor may include one or more image processing filters at the end of its flow that are used to reduce the resolution of the camera input to a suitable output resolution for display as a preview or for video encoding, or for implementing a digital zoom. For example, many camera devices are configured to take both high-resolution megapixel stills and to perform lower-resolution video capture, and they include an output (or backend) scaler to down-scale the high-resolution camera input to the lower-resolution video (e.g., down-scaling input image data from 5-9 megapixels to something more suitable for video encoding).

In some embodiments, such a scaler (sometimes referred to herein as an output rescaling unit) may already be able to handle translations and scaling, and may be modified to perform transformations that may apply arbitrary transformations, including rotations and perspective. In other words, in some embodiments, an existing or modified image signal processor may be leveraged to perform image stabilization, e.g., by configuring it to perform other types of filtering operations (e.g., per-pixel perspective transformations) and to apply those filtering operations to different portions of an input image, according to various parameters. In some embodiments, the image signal processor may also be modified to store additional parameters needed to allow different filtering operations to be applied to different portions of the image. By performing the transformations using the image signal processor as part of the image flow through the image processing pipeline, the additional system memory operations (and corresponding bandwidth and power consumption) typically associated with image stabilization may be avoided.

As noted above, in some embodiments, there may be a certain amount of information that needs to be maintained when performing in-stream piecewise perspective transformations. For example, in some embodiments, a table of piecewise perspective transforms may be encoded as digital difference analyzer (DDA) steppers to perform per-pixel perspective transformations to correct motion related image artifacts.

For example, in some embodiments, transformations may be applied to horizontal slices of an image. The size of an image slice may vary from embodiment to embodiment. In some embodiments the size of image slices may be fixed (e.g., 32 lines of pixel data), while in other embodiments the size of individual image slices may vary (or may be configurable). In some embodiments, a table of transformation parameters for each slice may be used. The translation parameters may be determined in any of various manners, such as computed from gyroscopic data or using optical-flow calculations, among others, according to various embodiments.

Thus, in some embodiments, the system may maintain a transformation matrix (e.g., 9 numbers) for each 32-pixel-high slice indicating how to transform the pixels in that slice. The transformation matrix for each slice may, in various embodiments, be a 3×3 matrix (e.g., for perspective transformations which utilize a "w" homogeneous coordinate value). For example, transformation parameters may represent a 3×3 matrix multiply between the output homogeneous coordinate (which may be referred to as: [ox oy 1]) and an input homogeneous coordinate (which may be referred to as: [x' y' w']). A perspective divide may then be performed to produce an input coordinate corresponding to a particular output coordinate (e.g., ix=x'/w', iy=y'/w'). The resulting fractional coordinate may then be used to interpolate from the input pixels, such as by using a polyphase resampling filter in some embodiments. The resulting fractional coordinate may also be perturbed (e.g., by a radial gain table, an additional mesh, and/or other distortions), such as to handle geometric distortion correction.

In this example, for a piecewise perspective transformation applied to an image with 1080p resolution, the system may need to store 34 such sets of numbers (i.e., 34 transformation matrixes), one for each set of 32 lines (e.g., 33 that have 32 lines of pixels and one that has the remaining 24 lines of pixels), rather than one set of transformation matrix numbers that are to be applied to an entire frame (without piecewise transformations). In some embodiments, the system may also include hardware for controlling how the system steps from slice to slice and the transformation matrix that is applied at each step (selecting the correct transformation for each slice).

In general, the transformation operation applied at each point in the image may include, for each output pixel, determining where the value of the output pixel can be found in the input image data (which may be an input pixel or may involve an interpolation between multiple input pixels, according to a fractional coordinate value), and applying a filter to resample the input image at that point to generate the output pixel.

Note that performing image stabilization operations using the image signal processor as part of its image flow may in some embodiments result in a delay in that image flow. However, in some embodiments, there may be delays for other reasons (e.g., frame delays) at various points in this flow, and any additional time to process the image due to performing image stabilization may be largely (or entirely) subsumed by those delays. In one example, the image signal processor may include a temporal filter that performs frame-to-frame comparisons, and this may cause a frame delay during which the system may gather gyroscope data or perform other operations necessary for programming the output rescaling unit to perform image stabilization when the image data reaches that stage of the image processing pipeline.

In some embodiments, the system may not necessarily be able to determine the motion of the camera before data for the entire frame has been received. However, delays earlier in the image processing pipeline may be taken advantage of, or the input from the camera sensor may be stored before it is passed to the image signal processor, which may result in a frame lag, but not necessarily a longer image processing time in the pipeline. In another example, in an embodiment in which the image signal processor includes a temporal filter, the system may be configured to detect, using the optical flow and/or gyroscopic data, what the motion vectors are as the lines of pixel data are received (e.g., before the image data for the whole image is available). In such embodiments, there may be a delay less than the time to process one frame. In another example, there may be delays due to processing and/or buffering between the stages of the image processing pipeline, which may be taken advantage of to avoid frame delays entirely (e.g., by shifting the determination of motion vectors toward the end of the image processing flow, just prior to when they are needed by the output rescaling unit to perform image stabilization transformations).

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example System

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images and/or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, super-pipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100. In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
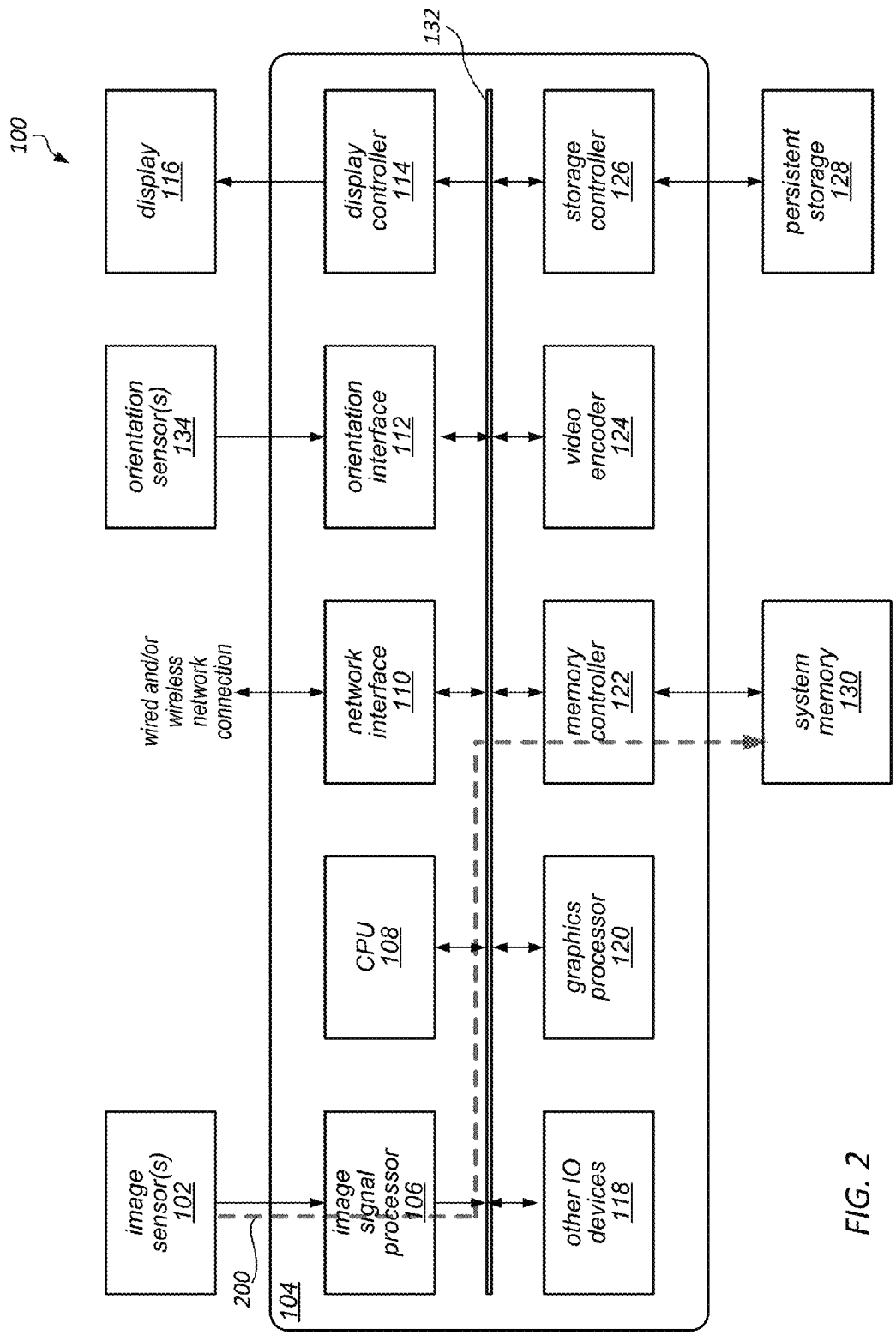
FIG. 2 is a logical block diagram illustrating an example data path in a system that may implement an image processing pipeline that performs in-stream piecewise perspective transformations, according to some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, and/or display controller 114) without storing the image data to system memory 130.

Figure 3:
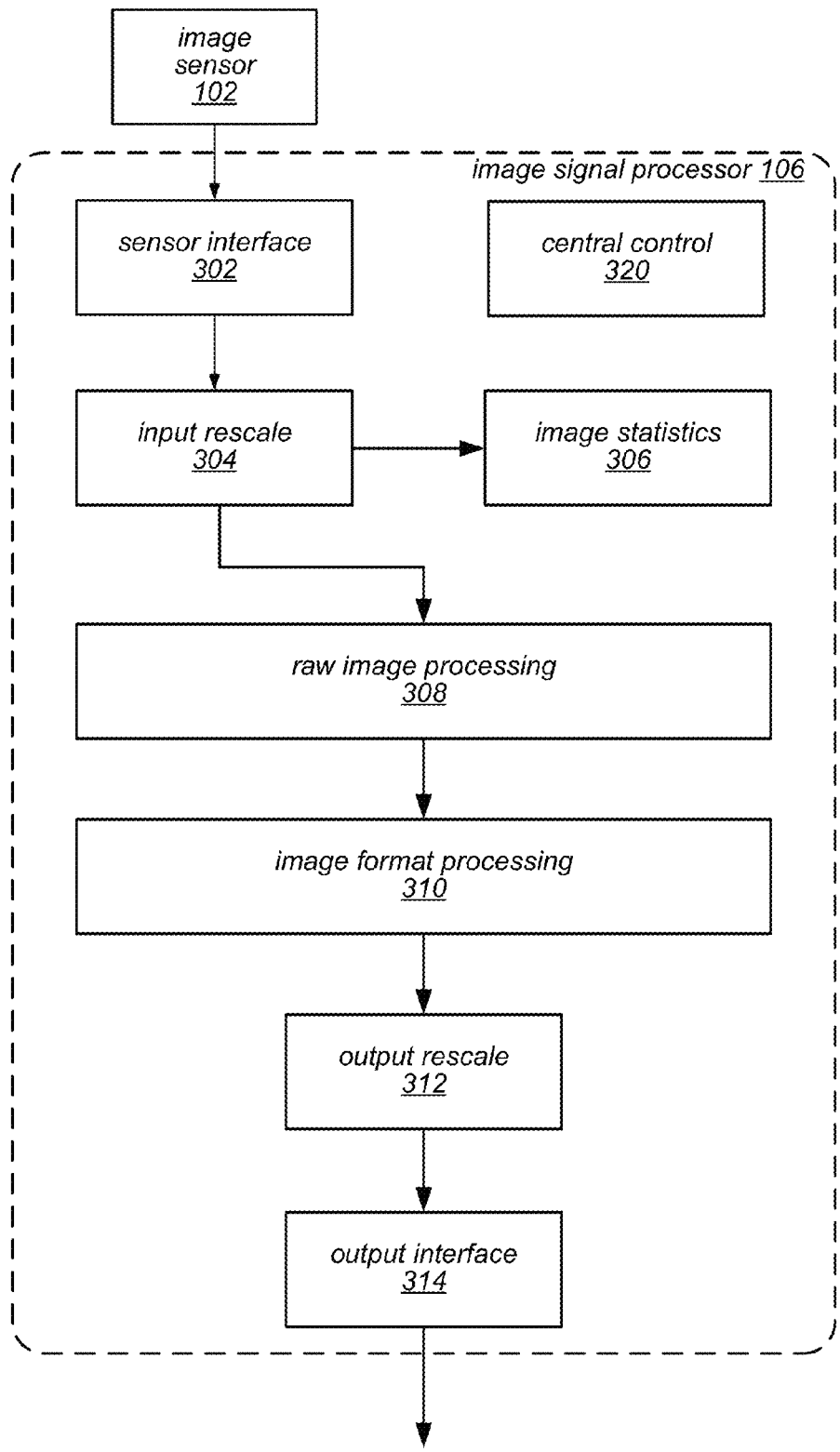
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image pipeline, i.e., a set of stages that process image information from creation (or capture) to output. For example, the various elements illustrated as components of ISP 106 process source data received from image sensor 102 through sensor interface 302 into image data usable by other stages in the pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks.

In various embodiments, ISP 106 may implement input rescale module 304. The input rescale module 304 operates on sensor (e.g., Bayer format) data, producing sensor (e.g., Bayer) output at a reduced resolution for the rest of the ISP 106 pipeline, which may reduce the power and bandwidth cost of image processing at the later stages, units, and/or modules of the ISP 106 pipeline when processing images to be output at lower resolutions than the full sensor resolution. The reduction in data provided by the input rescale module 304 allows the ISP 106 pipeline to produce high-quality output at reduced resolutions (for example, for video or smaller-resolution still images) from a high-pixel-count sensor. For example, the image rescale module 304 may convert Bayer format data from native sensor resolution (typically 8 megapixels (MP) or more) to video resolutions (typically 2 MP or less) by doing a rescale of the captured image data in the Bayer domain.

In some embodiments, input rescale module 304 may demosaic Bayer format image data received from image sensor 102, apply horizontal and vertical filtering to resample the image data, and then remosaic the resampled image data to generate downscaled Bayer format image data output for the remainder of the ISP 106 pipeline. In some embodiments of an input rescale module 304, the demosaic operation generates RGB pixel data, and horizontal filtering is applied to the RGB data to horizontally downscale the image. In some embodiments, input rescale module 304 may perform additional processing before and after the demosaic operation to, for example, handle pixel defects and filtering around highlight regions. In at least some embodiments, the RGB output of the horizontal filter operation may be converted to YCbCr, and the chroma portion of the YCbCr data may be reduced from chroma 4:4:4 to chroma 4:2:2. Vertical filtering is then applied separately to the luma and chroma data to vertically downscale the image. The chroma 4:2:2 data is then converted back to chroma 4:4:4, the YCbCr data is converted back to RGB data, and the RGB data is remosaiced to generate Bayer format data as output. In some embodiments, the vertical filtering path may be bypassed, and the RGB output of the horizontal filter operation may be remosaiced to generate Bayer format data as output.

In at least some embodiments of an ISP 106, the input rescale module 304 may be bypassed, or may be directed to perform a lesser amount resolution reduction, to allow the ISP 106 pipeline to process the captured image data at higher resolutions, for example for higher-quality still image photography. In some embodiments, the input rescale module 304 may perform some reduction in resolution for an image at the front of the ISP 106 pipeline. The ISP 106 pipeline may then process the image at the reduced resolution. At a later stage of the pipeline, for example at output rescale module 312, the image resolution may be further reduced to generate an image at a desired or required output resolution. Additionally, in some embodiments, output rescale module 312 may also be configured to perform (at least some portion of) one or more in-stream piecewise perspective transformations, as described herein.

In various embodiments, image signal processor 106 may implement image statistics module 306. Image statistics module 306 may perform various functions and collect information. For example image statistics module may, in some embodiments may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component Gr,R,B,Gb on the pixels image data (which may occur after sensor linearization). Fixed pattern noise reduction may be performed to remove offset fixed pattern noise and gain fixed pattern noise by subtracting a dark frame from an input image and multiplying different gains to pixels, in some embodiments. Temporal filtering may perform noise filtering based on pixel values from previous image frame. Defective pixel correction may determine or identify defective pixels, and may replace defective pixel values. Spatial noise filter may reduce noise in image data by averaging neighbor pixels that are similar in brightness. Lens shading correction may apply a gain per pixel to compensate for a dropoff in intensity roughly proportional to a distance from a lens optical center. White balance gains may provide digital gains for white balance, offset and clip independently for all color component Gr,R,B,Gb. Highlight recovery may estimate pixel values for those pixels that are clipped (or nearly clipped) from other channels. Raw scaling may scale down image data in a raw format (e.g., Bayer format). Please note that various examples and descriptions provided above are not intended to be limiting as to the various techniques or components implemented as part of raw image processing, but are instead merely provided as examples.

As noted above, in at least some embodiments, a temporal filter module, unit, or component may be implemented as part of raw image processing module 308. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels. In some embodiments, the temporal filter may implement dynamic motion estimation and compensation for image data as it is received on the fly, so that a reference image frame may be shifted to align with a current frame before filtering.

In various embodiments, image signal processor 106 may implement image format processing module 310. Image format processing module 308 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color component in RGB image data. Color correction may be performed using an RGB color correction matrix. RGB gamma mapping may provide a mapping between RGB values using a lookup table for gamma correction. Color space conversion may convert image data to another color format or space (e.g., RBG to YCbCr). Luma sharpening may sharpen luma values. Chroma suppression may attenuate chroma to gray (i.e. no color). Noise in chrominance channels may be filtered. Please note that various examples and descriptions provided above are not intended to be limiting as to the various techniques or components implemented as part of image format processing, but are instead merely provided as examples.

In various embodiments, image signal processor 106 may implement output rescale module 312. Output rescale module 312 may resample, transform and correct distortion on the fly as the ISP 160 processes image data. Output rescale module 312 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaler components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3.

Figure 5:
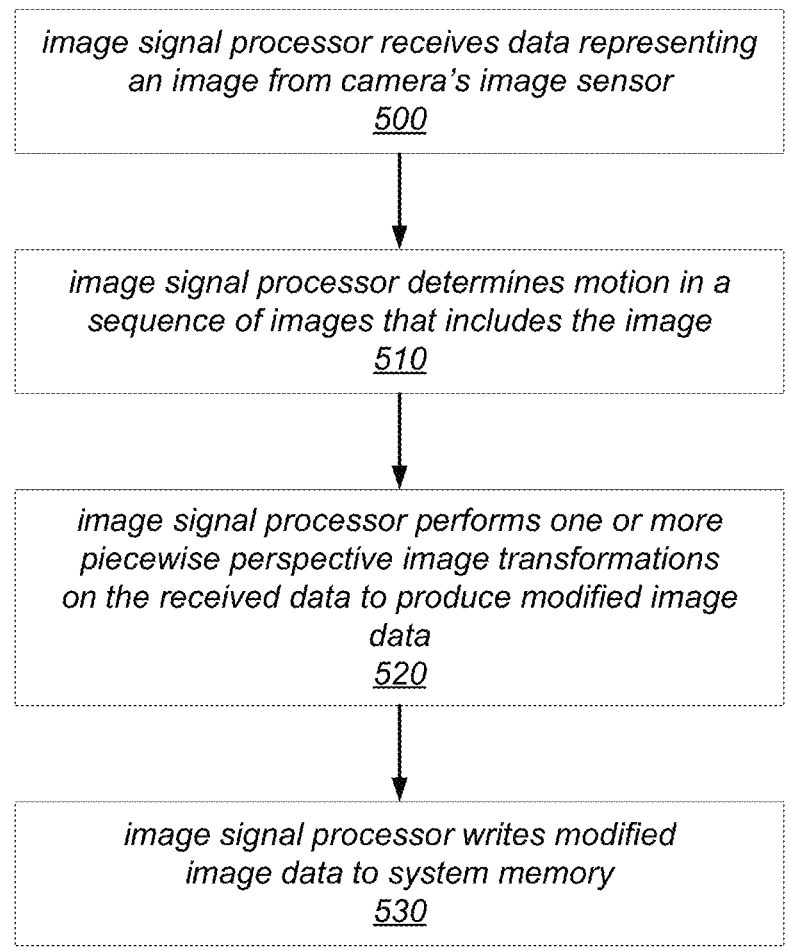
FIG. 5 is a flowchart illustrating one embodiment of a method for in-stream piecewise perspective transformations, as described herein.

One embodiment of a method for performing in-stream piecewise perspective transformations is illustrated by the flow diagram in FIG. 5. As illustrated in this example, the method may include an image signal processor receiving data representing an image from camera's image sensor, as shown in block 500. As previously described, the image signal processor may, in various embodiments, be a component of any type of device that includes a camera capable of capturing video clips (e.g., a camera, video camera, smart phone, tablet device, or portable multifunction device or other apparatus or system that includes such a camera). Image signal processor 106 may receive pixel data horizontally, line by line, as from a rolling shutter, in some embodiments.

As shown in block 510, the method may also include the image signal processor determining motion in a sequence of images that includes the image. This determination may be performed using any of a variety of techniques, including, but not limited to, those described herein (e.g., gathering motion data from a gyroscope component of the device or generating motion vectors based on optical flow calculations), in different embodiments.

As illustrated in this example, the method may also include the image signal processor performing one or more piecewise perspective image transformations on the received data (e.g., an image stabilization transformation such as a rotation, a shear transformation, or a perspective transformation) to produce modified image data, as shown in block 520. In some embodiments, to perform these transformations, the image signal processor may be configured to determine transformation parameters and/or generate transformation matrices by which the image signal processor (or various scaling and/or filtering units thereof) may perform piecewise perspective transformations.

As illustrated in block 530, the method may also include the image signal processor writing the modified image data out to a system memory, which may include providing the modified image data to a memory controller interface that is included in the camera-type device and that is coupled to the system memory. In some embodiments, the image data received from the camera's image sensor may only be provided to the memory controller and/or written to the system memory after one or more piecewise perspective transformations have been applied to the image data (e.g., for image stabilizing, scaling, and/or other purposes).

In some embodiments, different operations of performing in-stream piecewise perspective transformations may be performed in different areas, and by different modules of an image signal processing. For example, in one embodiment, one module of image signal processor 106 may determine motion data while another module (e.g., output rescaler module 312) may apply the transformations to the image data.

In some embodiments, various in-stream perspective transformations (such as those described herein) may be performed by output rescaler module 312. In other words, it may be this component of image signal processor 106 that is configured to perform scaling to provide video data suitable for display, for video encoding etc., and that in some embodiments may also be configured to perform filtering operations (e.g., transformations) for image stabilization, as described herein, prior to writing out transformed image data to system memory through memory controller interface 122.

Figure 6:
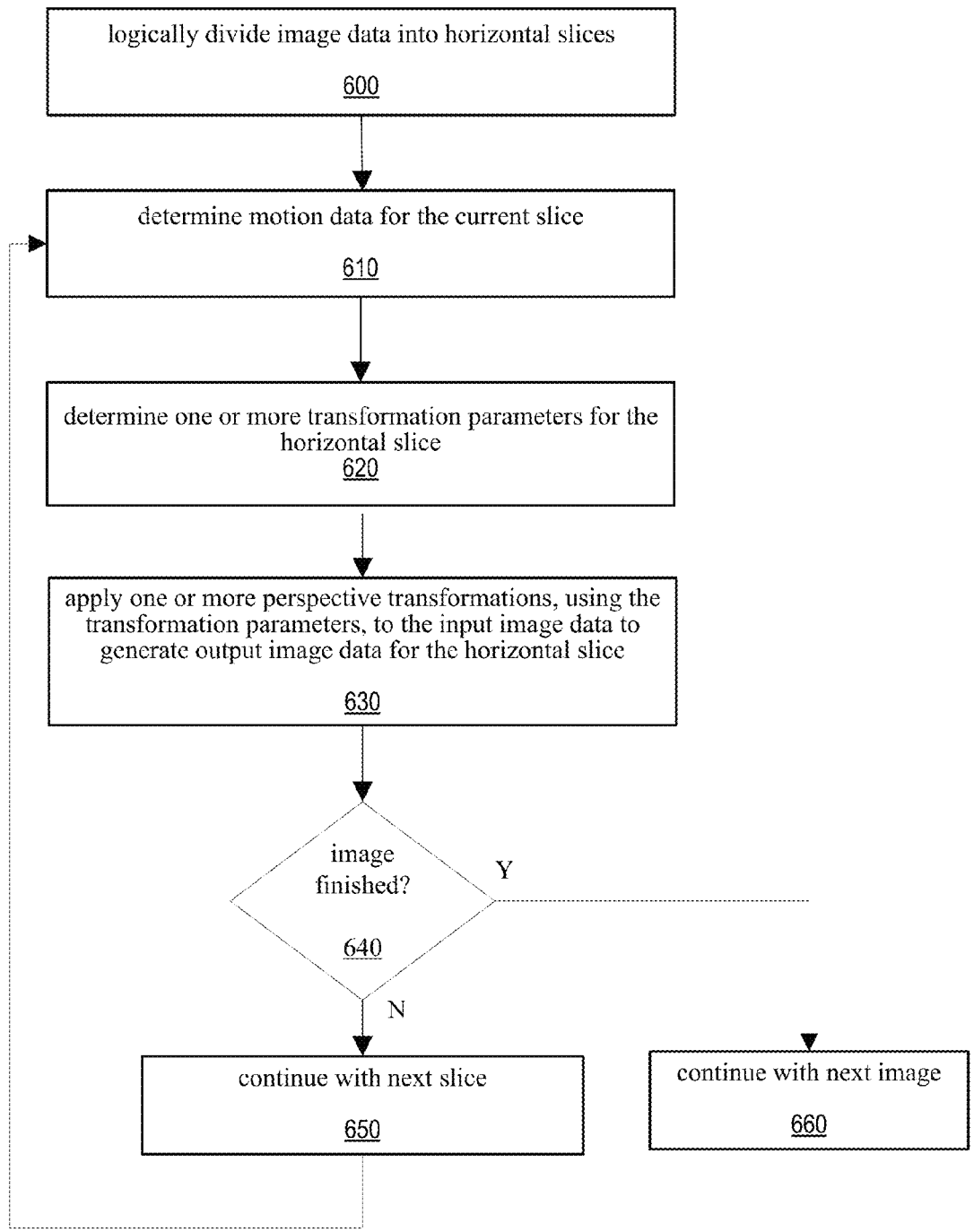
FIG. 6 is a flowchart illustrating one embodiment of a method for performing in-stream piecewise perspective transformations on horizontal image slices, according to one embodiment.

As noted above, in some embodiments transformations maybe applied piecewise to image data divided into multiple horizontal slices. FIG. 6 is a flowchart illustrating one embodiment of method for applying perspective transformations to image data using horizontal slices.

Note that in some embodiments, the image signal processor may be a streaming device. In other words, pixels may be received by the image signal processor from the camera in raster order (i.e., horizontally, line by line) and may in general be processed through its various pipeline stages in raster order, until finally being written out as a completed image to memory in raster order. Therefore in order to perform a non-separable operation such as a rotation, the image signal processor may need to buffer up enough lines of the image to handle the maximum vertical displacement along the output raster scan line. The worst-case scenario might be a 90-degree rotation, which would effectively require a full frame buffer to process, since pixels would be coming from the camera in a horizontal raster order, but leaving in a vertical raster order. In this example case, a traditional output scaler may not be able to produce the first line for the output until it has seen the last line from the camera input.

In some embodiments, however, the system may be configured to handle rotations by smaller amounts without the need for such extensive buffering. For example, by configuring an output rescaling unit to perform piecewise transformations, the image signal processor may be able to apply image stabilization transformations in small amounts (e.g., up to a pre-determined limit, based on the extent to which the problem is sub-divided, i.e., the size of the available buffers). In other words, in order to handle a small non-separable transformation (e.g., a small amount of rotation or another small warping transformation) the image signal processor may be configured to buffer a small portion of the frame.

As shown in block 600, an image signal processor may be configured to divide the image data into horizontal slices, according to some embodiments. For example, image signal processor 106 may be configured to generate a modified output image based on a captured image (e.g., received from image sensor 102). Thus, image signal processor 106 may be configured to logically divide the image data for the modified output image into multiple horizontal slices. In some embodiments, the size (e.g., height in pixels) of horizontal slices may be fixed. For example, in some embodiments, image signal processor 106 may use a fixed size representing 32 pixel lines of the image data for horizontal slices. In other embodiments, however, the size of horizontal slices may vary from image to image, or from slice to slice.

In some embodiments, the number of lines of pixels in the line buffers may be pre-determined and/or may be configurable or tunable by the user, and may be based on the desired granularity of the image stabilization operations. In other embodiments, the number of lines of pixels that are processed in the buffers using the same parameters (i.e., the height of the horizontal slices) may be variable within the image. For example, in one embodiment, transformation parameters may be defined with higher granularity (e.g., defining different parameter values for each set of eight lines) in the most important portion(s) of an image (e.g., in the middle of the image, or in the portion of the image containing the subject of the image), while transformation parameters may be defined with less granularity (e.g., defining different parameter values for each set of 64 lines) in less important portions of the image (e.g., at the top and bottom of the image). In still other embodiments, transformation parameters may vary across a single line of pixels.

For example, in one embodiment in which different transformation parameters are re-defined every 32 lines, the first line of a slice may use the parameter values in a first set of parameter values, and the $33^{nd}$ line of the slice may use the parameter values of the next set of parameter values. In this example, the parameter values applied to the lines in between may be the result of a linear interpolation between the two, such that for the $16^{th}$ line, the values applied to the line may be the result of an equal weighting between the two sets of parameter values. In other embodiments, there may be a non-linear weighting between the two sets of parameter values (e.g., based on the position of the slice within the image, the relative importance of the different slices in the image, or on other factors).

As shown in block 610, image signal processor 106 may be configured to determine motion data for the current slice. In some embodiments, determining the motion may include receiving and using data from a gyroscope in the camera (e.g., a gyroscope that is integrated on the same device that contains the CMOS image sensor of the camera, or a gyroscope that is implemented by, for example, a separate MEMS device in the system). In other embodiments, determining the motion may include generating motion vectors based on optical flow calculations.

Image signal processor 106 may be configured to determine one or more transformation parameters for the current horizontal slice, as shown in block 620. As noted above, regardless of how the motion is determined and the corresponding motion data is generated, transformations may be applied to the resulting image to adjust for the determined motion. In some embodiments, a table of transformation parameters for each slice may be used. The translation parameters may be determined in any of various manners, such as computed from gyroscopic data or using optical-flow calculations, among others, according to various embodiments. In various embodiments, these transformations may include any combination of offset translation, rotation, scaling, shear transformation and/or perspective transformation. Additionally, in some embodiments, one or more transformation parameters may be determined for the next slice (if any) as well as for the current slice. For instance, as noted above, the 33$^{rd}$ line of the current slice may use parameters of the next slice and therefore at least some parameters for the next slice may be determined when determining parameters for the current slice, As shown in block 630, image signal processor 106 may be configured to apply one or more perspective transformations, using the transformation parameters, to the input image data to generate output image data for the horizontal slice. For instance, in one example embodiment, an image signal processor may divide the output image into a series of horizontal 'slices' of fixed height. For each slice, transformation parameters may be read out from a table holding the transformation parameters for each slice (e.g., these can be computed from gyroscope data, or using optical-flow calculations, or a variety of other ways). The transformation parameters may represent a 3×3 matrix multiply between an output homogeneous coordinate, [ox oy 1] and an input homogeneous coordinate, [x' y' w']. Note that a homogeneous coordinate may be referred to herein by three values within square brackets (e.g., [ox oy 1] or [x' y' w']). Also note that, as used herein, ix refers to input x, iy to input y, ox to output x, oy to output y.

In some embodiments, a perspective divide may then be performed to produce an input coordinate (e.g., ix=x'/w', iy=y'/w'). The resulting fractional coordinate may then be used to interpolate from the input pixels using a polyphase resampling filter, for example. For instance, one example multi-tap polyphase resampling filter may use pixels from the source image, may multiply each pixel by a signed weighting (or coefficient) factor (which could be negative), and may then sum them (with rounding) to form the destination pixel. Which input pixels are chosen may depend on the current pixel position (possibly adjusted for vertical displacement) and the number of taps. The coefficients may come from a table (programmed by software) and may be determined by fractional component of the vertical (Y) coordinate.

Additionally, in some embodiments, a resulting fractional coordinate may also be perturbed (e.g., by a radial gain table, an additional mesh or other distortion), such as to handle geometric distortion correction.

Note that, as used herein, lower case letters (e.g., x, x', y, y', w, w') may refer to coordinates of a location within a set of graphical data (e.g., within an image or a set of pixel lines) while upper case letters (e.g., X, Y, W) may refer to different categories of directions or offsets (e.g., vertical, horizontal, perspective) within a graphical space. Additionally, upper case letters may refer to particular elements of mathematical formulae or programmatic algorithms (e.g., DDA steppers X, Y and W).

Thus, image signal processor 106 may be configured to use the transformation parameters to perform one or more perspective transforms on the input image data to generate output image data for the horizontal slice, as shown in block 630. If image signal processor 106 has finished all the slices of the current image, as shown by the positive output of block 640, image signal processor 106 may then continue with the next image, if there are multiple images to process (e.g., such as when capturing and processing a video stream of multiple images), as shown in block 660. If however, there is further data to process for the current image, image signal processor 106 may be configured to continue with the next horizontal slice, as shown in block 650.

Figure 7:
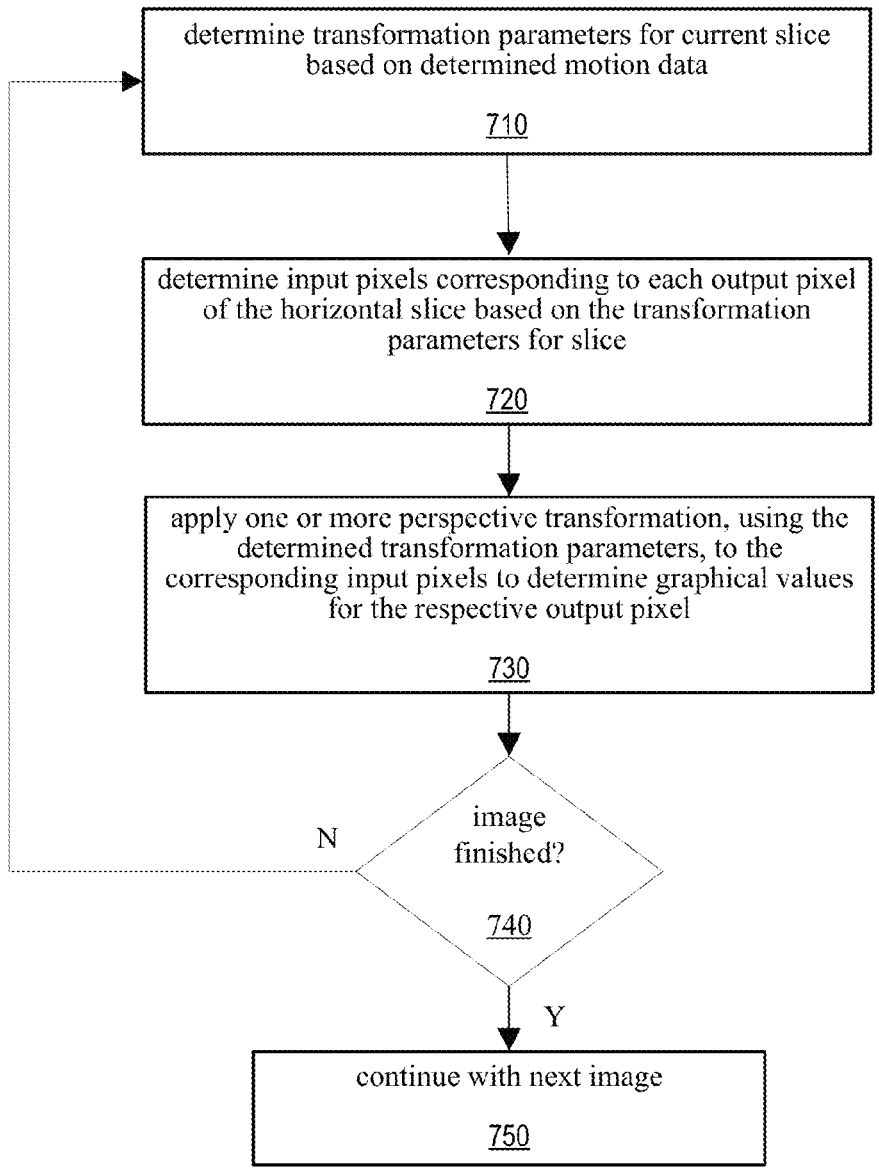
FIG. 7 is a flowchart illustrating one embodiment of a method for performing in-stream piecewise perspective transformations, according to one embodiment.

As discussed above, image processor 106 may be configured to apply transformation in a piecewise fashion, such as by logically dividing an image into multiple horizontal slices and applying transformations to each slice. FIG. 7 is a flowchart illustrating one embodiment of method for applying in-stream piecewise perspective transformations. As shown in block 710, image signal processor 106 may determine transformation parameters for the current slice based on determine motion data. As noted above, motion data may be determined in any of various ways, such as by utilizing gyroscopic data and/or optical flow calculations, according to various embodiments. Additionally, in some embodiments, motion data may be determined in more than one manner. For instance, in some embodiment, image signal processor 106 may be configured to utilize both gyroscopic data and optical flow calculations to determine motion data. For example image signal processor 106 may utilize gyroscopic data to quickly determine coarse grained motion data which may then be refined using optical flow calculations.

As shown in block 720, image signal processor 106 may be configured to determine input pixels corresponding to each output pixel of the horizontal slice based on the transformations parameters for the slice, according to some embodiments. For example, image signal processor 106, and/or an output rescale module thereof, may be configured to do image resampling using a separable implementation of horizontal and vertical scalers. Each scaler may be driven by a digital difference analyzer (DDA), such as consisting of fractional Init and Step values in each direction. The step values may be accumulated per-pixel and quantized to produce a pixel offset and a fractional filter phase for filtering, in some embodiments. In some embodiments, image signal processor 106 and/or output rescale module 312, may include multiple DDA steppers for X, Y and W, may compute each local DDA, and then may perform per-pixel divides to produce an input fractional coordinate. These steppers may be re-initialized for each horizontal slice, such as by using a table containing transformation parameters for all the horizontal slices. The transformation parameters may be determined (e.g., calculated) based on the determined motion data while the image data is being captured and processed or by utilizing a delay, such as may be provided by a temporal filter of the image signal processor (as discussed above).

As shown in block 730, image signal processor 106, and/or output rescale module 312, may be configured to apply one or more perspective transformations, using the determined transformation parameters, to the corresponding input pixels to determine graphical values for the respective output pixel, according to some embodiments. In some embodiments, an output scaler unit (or module) of image signal processor 106 may be configured to apply one or more perspective transformations to the image data in order to determine graphical value for the modified output image. In other words, an output scaler may be configured to determine input pixels that correspond to each output pixel using one or more transformations to compensate and/or correct (at least partially) for motion-related artifacts, as will be described in more detail below.

If as indicated by the negative output from decision block 740, image signal processor 106 has not completed the current image, it may continue to process the image by moving on to the next horizontal slice. If however, the current image is completed, image signal processor 106 may continue by beginning to process the next image (if there is one to process), as shown in block 750.

Figure 8:
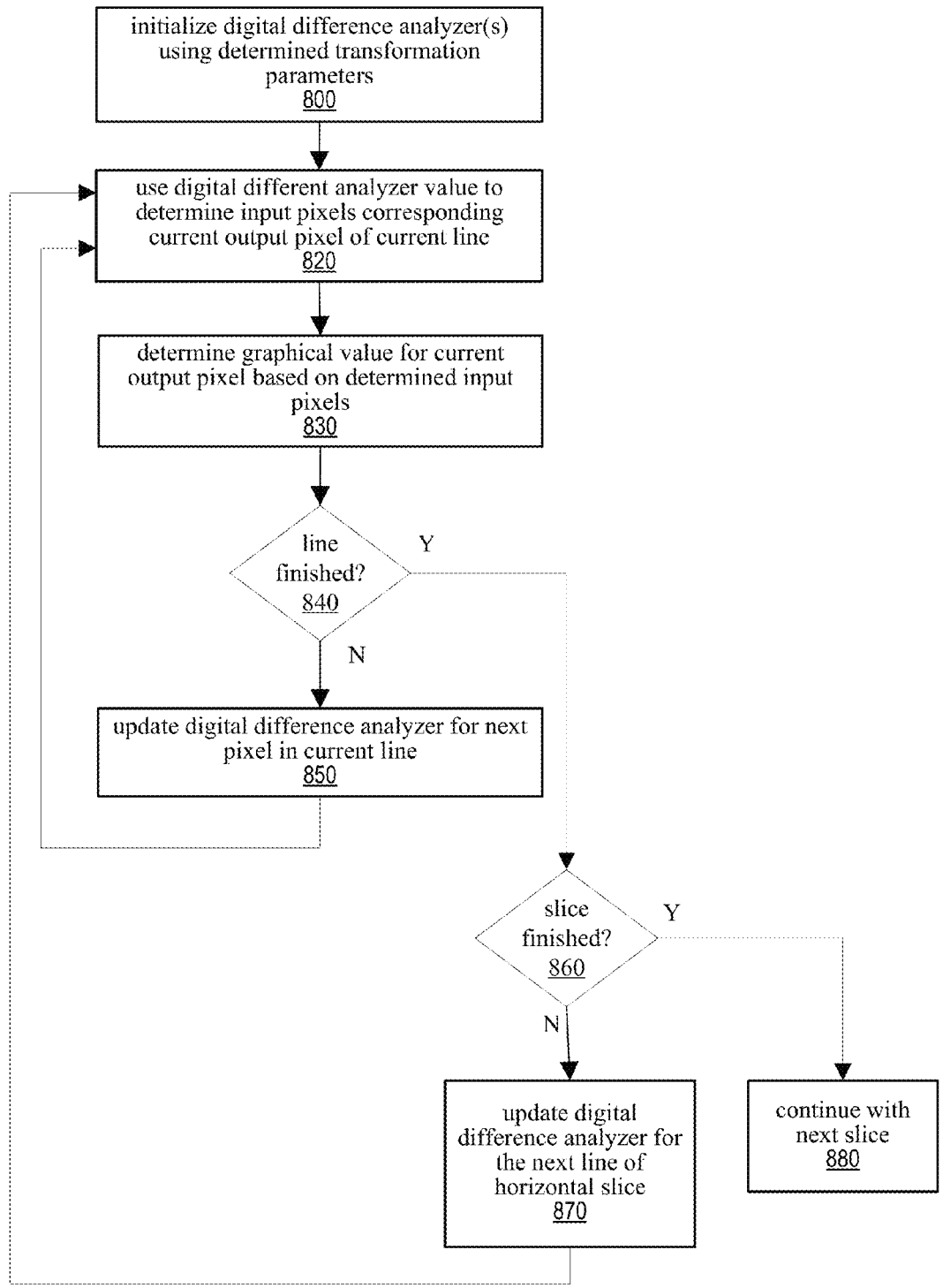
FIG. 8 is a flowchart illustrating one embodiment of a method for performing in-stream piecewise perspective transformations, according to one embodiment.

Turning now to FIG. 8, which is a flowchart illustrating one embodiment of a method for performing in-stream piecewise perspective transformations. As noted above, an image signal process and/or output rescaler module, may be configured to utilize multiple DDA steppers for X, Y and W when performing perspective transformations. As shown in block 800, image signal processor 106 may initialize the digital difference analyzer(s) using the determined transformation parameters. As noted above, transformation parameters may be determined in any of various manners, according to different embodiments. Image signal processor 106 may use the DDA value to determine input pixels corresponding to the current output pixel of the current line (of the current horizontal slice), as shown in block 820.

For example, the transformation parameters may represent a 3×3 matrix multiply between an output homogeneous coordinate, [ox oy 1] and an input homogeneous coordinate, [x' y' w']. Note that a homogeneous coordinate may be referred to herein by three values within square brackets (e.g., [ox oy 1] or [x' y' w']). Also note that, as used herein, ix refers to input x, iy to input y, ox to output x, oy to output y. In some embodiments, a perspective divide may then be performed to produce an input coordinate (e.g., ix=x'/w', iy=y'/w'). The resulting fractional coordinate may then be used to interpolate from the input pixels using a polyphase resampling filter, for example.

As shown in block 830, image signal processor 106 may then determine one or more graphical values for the current output pixel based on the determine input pixels, according to some embodiments.

Note that in some embodiments, transformations and/or scaling operations may be performed efficiently when these operations are separable operations. For example, a horizontal scaling or translation operation (e.g., a change in width or displacement along the width) may be performed by looking only at the pixels within a horizontal line. The same may be true for vertical scaling or translation operations (e.g., they may be performed by looking only at the pixels within a vertical column). However, this may not be true for operations such as rotation, shear transformations, or perspective transformations, and/or for transformations for correcting rolling shutter artifacts (i.e., these operations may not be separable), since these operations may require pixels from a much larger area. For example, in order to perform a 45-degree rotation of an image, for each horizontal line in the output image, the system would need to sample a 45-degree line in the source image, which would include pixels in many horizontal lines and many vertical columns.

As noted above, image signal processor 106, and/or output rescaler module 312, may be configured to perform image resampling using a separable implementation of horizontal and vertical scalers. Each scaler may be driven by a digital difference analyzer (DDA), such as consisting of fractional Init and Step values in each direction. The step values may be accumulated per-pixel and quantized to produce a pixel offset and a fractional filter phase for filtering, in some embodiments. In some embodiments, image signal processor 106 and/or output rescale module 312, may include multiple DDA steppers for X, Y and W, may compute each local DDA, and then may perform per-pixel divides to produce an input fractional coordinate.

In some embodiments, resampling may be separable. That is, X may not depend on Y) and the filtering hardware (e.g., image signal processor 106 and/or output rescaler module 312) may include separate non-interacting stages for horizontal and vertical filtering. The same may not be true of a perspective transform. X and Y may depend on each other and a perspective transform may not be implemented as independent horizontal and vertical units, in some embodiments. However, in some embodiments, in-stream piecewise perspective transformations may be performed using separable hardware (e.g., a scaler module that can only perform separable transforms) by utilizing multiple steppers in the scaler module. In some embodiments, the error caused by utilizing separable resampling may be insignificant (e.g., to the overall output quality of an image).

For instance, in one example embodiment, multiple individual steppers may be used to implement a vertical resampling followed by a horizontal resampling. Thus, in the example embodiment, the following steppers may be utilized:

X_Init, X_StepX, X_StepY, X_StepXY: Steppers for X in the (ix, oy) coordinate space
WX_Init, WX_StepX, WX_StepY, WX_StepXY: Steppers for W in the (ix, oy) coordinate space
Y_Init, Y_StepX, Y_StepY, Y_StepXY: Steppers for Y in the (ix, iy) coordinate space
WY_Init, WY_StepX, WY_StepY, WY_StepXY: Steppers for W in the (ix, iy) coordinate space Where (ix, iy) is the input coordinate space and (ix, oy) is the coordinate space representing the result after the vertical scaling pass, according to this example embodiment. Thus, each stepper may compute its value per-pixel using a single algorithm. For instance, the following pseudo code may represent one example of an algorithm for modeling one of the DDA steppers (of which there are generally at least three copies: X, Y and W). After the three DDA values are computed at each pixel, the transform may compute the input coordinate, such as by dividing X and Y by W and filtering the input at that fractional coordinate. Additionally, in some embodiments, one or more of the per-slice parameters (e.g., Init, StepX, StepY and/or StepXY) for each DDA may be loaded from a transform table for each slice.

```
for oy in 0..OutputHeight-1 {
    DDA = Init // set initial value at start of line
    for ox in 0..OutputWidth-1 {
        if oy % SliceHeight == 0 { // oy is a multiple of Slice Height
                                    // % is the modulo (remainder)
                                    operation
            Init, StepX, StepY, StepXY = TransformTable[oy /
            SliceHeight]
                        // read parameters for next slice
        }
        // Use DDA value ...
        DDA = DDA + StepX // add StepX increment for each X step
    }
    Init = Init + StepY // add StepY increment to line start at each Y step
    StepX = StepX + StepXY // add StepXY increment to line step after
    each line
}
```

When using the DDA value, image signal processor 106 may be configured to perform various interpolations and/or other image/color operations on the graphical values of the determined input pixels to determine the graphical value to use for the corresponding output pixel. Thus, image signal processor 106 may be configured to determine a graphical value for an output pixel based on the determined input pixels, as shown in block 830. If, as indicated by the negative output of decision block 840, image signal processor 106 has not completed processing the current line of the current slice, the DDA may be updated for the next pixel in the current line. For example, one or more stepper values, such as StepX in the above example, may be used to update the DDA after processing each output pixel of a line.

Similarly, if after finishing a complete line, but prior to completing an entire horizontal slice, as indicated by the positive output of decision block 840 and the negative output of decision block 860, image signal processor 106 may update the DDA for the next line of the slice. For example, one or more stepper values, such as StepY and StepXY in the above example, may be used to update the DDA to prepare for processing the next line of the horizontal slice. Once the entire slice has been processed, as indicated by the positive output of decision block 860, image signal processor 106 may continue with the next horizontal slice, as shown by block 880.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. An apparatus, comprising:
   an image sensor;
   an image signal processor; and
   a system memory;
   wherein the image signal processor is configured to:
      receive data representing an image from the image sensor;
      generate an output image based on the received image data, wherein to generate the output image, the image signal processor is further configured to:
         determine motion for a portion of the received data corresponding to a first horizontal slice of a plurality of horizontal slices for the output image;
         apply one or more perspective transformations to the received data corresponding to the first horizontal slice to produce modified image data, wherein the one or more perspective transformations are based on the determined motion; and
         provide, subsequent to applying the perspective transformations and prior to determining motion for at least one other slice of the plurality of horizontal slices, the modified image data to the system memory.

2. The apparatus of claim 1, wherein to apply the one or more perspective transformations, the image signal processor is further configured to:
   determine, for the first horizontal slice, one or more transformation parameters based on the determined motion;
   apply the one or more perspective transformations, using the one or more transformation parameters, to input pixels of the received data to determine graphical values for each output pixel of the first horizontal slice.

3. The apparatus of claim 2, wherein the image signal processor is further configured to determine, for each output pixel of the first horizontal slice, corresponding input pixels of the received data based on the determined transformation parameters for the first horizontal slice.

4. The apparatus of claim 2, wherein the one or more transformation parameters are encoded as one or more digital difference analyzer steppers.

5. The apparatus of claim 2, wherein the one or more transformation parameters comprise a 3×3 matrix multiplication between an output homogeneous coordinate of the modified image data and an input homogeneous coordinate of the received image data.

6. The apparatus of claim 1, further comprising a gyroscopic unit, wherein the image signal processor is further configured to receive gyroscopic data from the gyroscopic unit, wherein the determined motion is based, at least in part, on the gyroscopic data.

7. The apparatus of claim 1, wherein the image signal processor is further configured to determine the motion based, at least in part, on one or more optical-flow calculations performed on the received image data.

8. The apparatus of claim 1, wherein the image signal processor is further configured to perform one or more perspective divide operations on the modified image data.

9. The apparatus of claim 1, wherein the image signal processor is further configured to perform one or more polyphase resampling filter operations on the modified image data.

10. The apparatus of claim 1, wherein the image signal processor is further configured to perform one or more digital difference analyzer stepper operations as part of the one or more perspective transformations.

11. A method, comprising:
    receiving, by an image signal processor, data representing an image from an image sensor;
    generating, by the image signal processor, an output image based on the modified image data, wherein said generating comprises:
       determining, by the image signal processor, motion for a portion of the received data corresponding to a first horizontal slice of a plurality of horizontal slices for the output image;
       applying, by the image signal processor, one or more perspective transformations to the received data corresponding to the first horizontal slice to produce modified image data, wherein the one or more perspective transformations are based on the determined motion; and providing, by the image signal processor, subsequent to applying the perspective transformations and prior to determining motion for at least one other slice of the plurality of slices, the modified image data to system memory.

12. The method of claim 11, wherein said applying one or more perspective transformations comprises:
   determining, for the first horizontal slice, one or more transformation parameters based on the determined motion; and
   applying the one or more perspective transformations, using the one or more transformation parameters, to input pixels of the received data to determine graphical values for each output pixel of the first horizontal slice.

13. The method of claim 11, further comprising receiving gyroscopic data for the received image data, wherein the determined motion is based, as least in part, on the gyroscopic data.

14. The method of claim 11, wherein the determined motion is based, at least in part, on one or more optical-flow calculations performed on the received image data.

15. The method of claim 11, wherein said applying the one or more perspective transformations comprises performing one or more digital difference analyzer stepper operations.

16. A system, comprising: a device configured to perform image processing, the device comprising:
   a sensor interface configured to receive image data from an image sensor; and
   an image processing pipeline configured to:
      receive data representing an image from the image sensor;
      generate an output image based on the received image data, wherein to generate the output image, the image processing pipeline is further configured to:
         logically divide the output image into a plurality of horizontal slices;
         determine motion for a portion of the received data corresponding to a first horizontal slice of the plurality of horizontal slices;
         apply one or more perspective transformations to the received data corresponding to the first horizontal slice to produce modified image data, wherein the one or more perspective transformations are based on the determined motion; and
         provide, subsequent to applying the perspective transformations and prior to determining motion for at least one other slice of the plurality of horizontal slices, the modified image data to system memory.

17. The system of claim 16, wherein to apply the one or more perspective transformations, the image processing pipeline is further configured to:
   determine, for the first horizontal slice, one or more transformation parameters based on the determined motion; and
   apply the one or more perspective transformations, using the one or more transformation parameters, to input pixels of the received data to determine graphical values for each output pixel of the first horizontal slice.

18. The system of claim 17, wherein the image processing pipeline is further configured to determine, for each output pixel of the first horizontal slice, corresponding input pixels of the received data based on the determined transformation parameters for the first horizontal slice.

19. The system of claim 16, further comprising a gyroscopic module, wherein the image processing pipeline is further configured to receive the motion data from the gyroscopic module.

20. The system of claim 16, wherein the image processing pipeline is further configured to perform one or more polyphase resampling filter operations on the modified image data.

* * * * *